United States Patent
Benazet et al.

(10) Patent No.: US 10,951,322 B2
(45) Date of Patent: Mar. 16, 2021

(54) DUAL-BAND PHOTONIC DEVICE AND METHOD FOR CONVERTING FREQUENCY

(71) Applicant: THALES, Courbevoie (FR)

(72) Inventors: Benoit Benazet, Toulouse (FR); Michel Sotom, Toulouse (FR); Muriel Aveline, Toulouse (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 16/288,013

(22) Filed: Feb. 27, 2019

(65) Prior Publication Data

US 2019/0273562 A1    Sep. 5, 2019

(30) Foreign Application Priority Data

Mar. 1, 2018 (FR) ..................... 1800178

(51) Int. Cl.
*H04B 10/548* (2013.01)
*G02F 1/21* (2006.01)
(Continued)

(52) U.S. Cl.
CPC .......... *H04B 10/548* (2013.01); *G02F 1/21* (2013.01); *G02F 2/00* (2013.01); *H04B 10/118* (2013.01);
(Continued)

(58) Field of Classification Search
CPC ............. H04B 10/548; H04B 10/118; H04B 2210/006; G02F 2/00; G02F 1/21;
(Continued)

(56) References Cited

U.S. PATENT DOCUMENTS

| 5,550,667 A | * | 8/1996 | Krimmel | ............ H04B 10/2537 |
| | | | | 398/193 |
| 5,777,771 A | * | 7/1998 | Smith | ............... H04B 10/25758 |
| | | | | 398/182 |

(Continued)

FOREIGN PATENT DOCUMENTS

| EP | 2 827 515 A1 | 1/2015 |
| FR | 2 864 385 A1 | 6/2005 |
| FR | 3 043 514 A1 | 5/2017 |

OTHER PUBLICATIONS

Smith et al, Technique for optical SSB generation to overcome dispersion penalties in fibre radio systems, Jan. 1997, Electronics Letters, vol. 33 Issue 1, pp. 74-75. (Year: 1997).*

(Continued)

*Primary Examiner* — Dibson J Sanchez
(74) *Attorney, Agent, or Firm* — BakerHostetler

(57) ABSTRACT

A photonic frequency converter includes an electro-optical intensity modulator having an optical input, one optical output and at least one RF input for receiving two modulation radiofrequency signals at different frequencies; a set of optical sources that are configured to generate optical signals at at least two different wavelengths, the signals being modulated by respective local-oscillator signals at least two of which have different frequencies; and an optical multiplexer arranged to multiplex the optical signals and to inject them into the optical input of the modulator. A method for converting frequency by means of such a converter is also provided.

11 Claims, 9 Drawing Sheets

(51) Int. Cl.
*H04B 10/118* (2013.01)
*H04Q 11/00* (2006.01)
*G02F 2/00* (2006.01)

(52) U.S. Cl.
CPC ..... *H04Q 11/0003* (2013.01); *H04Q 11/0005* (2013.01); *G02F 1/212* (2021.01); *H04B 2210/006* (2013.01); *H04Q 2011/0039* (2013.01); *H04Q 2011/0041* (2013.01)

(58) Field of Classification Search
CPC .......... G02F 2001/212; H04Q 11/0003; H04Q 11/0005; H04Q 2011/0039; H04Q 2011/0041
USPC .................................................. 398/182–201
See application file for complete search history.

(56) References Cited

U.S. PATENT DOCUMENTS

| | | | | |
|---|---|---|---|---|
| 5,940,196 A * | 8/1999 | Piehler | H04B 10/50 | 398/66 |
| 6,181,450 B1 * | 1/2001 | Dishman | H04B 7/18521 | 370/281 |
| 6,246,500 B1 * | 6/2001 | Ackerman | H04B 10/505 | 398/115 |
| 6,556,327 B1 * | 4/2003 | Ohya | H04B 10/505 | 398/141 |
| 6,594,070 B2 * | 7/2003 | Sugata | H03L 7/099 | 359/326 |
| 6,775,483 B1 * | 8/2004 | Ikushima | H04J 14/02 | 398/183 |
| 7,079,780 B1 * | 7/2006 | Rollins | H04B 10/505 | 359/238 |
| 7,103,285 B1 * | 9/2006 | Okuno | H04B 10/504 | 398/185 |
| 7,133,621 B1 * | 11/2006 | An | H04B 10/505 | 398/185 |
| 7,245,833 B1 * | 7/2007 | Volkening | H04B 10/2575 | 398/116 |
| 7,773,883 B1 * | 8/2010 | Weng | H04J 14/0227 | 398/83 |
| 7,936,997 B2 * | 5/2011 | Ramachandran | H04B 10/25751 | 398/192 |
| 8,059,969 B1 * | 11/2011 | Yap | H04B 10/25759 | 398/140 |
| 8,948,608 B1 * | 2/2015 | Pobanz | H04B 10/25 | 398/183 |
| 9,559,780 B2 * | 1/2017 | Schemmann | H04B 10/588 | |
| 9,973,278 B2 * | 5/2018 | Wang | H04B 10/5161 | |
| 10,164,711 B2 * | 12/2018 | Yu | H04B 10/90 | |
| 10,250,330 B1 * | 4/2019 | Cabello | H04B 10/118 | |
| 2002/0012495 A1 * | 1/2002 | Sasai | H04B 10/25753 | 385/24 |
| 2002/0018213 A1 * | 2/2002 | Ibukuro | G01M 11/333 | 356/484 |
| 2002/0030877 A1 * | 3/2002 | Way | H04B 10/50 | 398/185 |
| 2002/0186437 A1 * | 12/2002 | Sasaoka | G01M 11/333 | 398/158 |
| 2003/0076567 A1 * | 4/2003 | Matthews | H04B 10/505 | 398/183 |
| 2003/0090777 A1 * | 5/2003 | Yap | H01Q 3/2676 | 359/333 |
| 2003/0198478 A1 * | 10/2003 | Vrazel | H04B 10/5561 | 398/183 |
| 2005/0078965 A1 * | 4/2005 | Kim | H04B 10/505 | 398/183 |
| 2005/0286908 A1 * | 12/2005 | Way | H04B 10/506 | 398/186 |
| 2006/0018667 A1 * | 1/2006 | Lee | H04B 10/5167 | 398/186 |
| 2008/0130696 A1 * | 6/2008 | Shahine | H01S 5/0265 | 372/38.02 |
| 2009/0110408 A1 * | 4/2009 | Dallesasse | H04B 10/504 | 398/185 |
| 2009/0297140 A1 * | 12/2009 | Heismann | G01M 11/333 | 398/16 |
| 2010/0266289 A1 * | 10/2010 | Devgan | H04B 1/18 | 398/147 |
| 2011/0150484 A1 * | 6/2011 | Wang | H04B 10/2537 | 398/115 |
| 2013/0064546 A1 * | 3/2013 | Peach | H04B 10/506 | 398/79 |
| 2013/0142521 A1 * | 6/2013 | Dispenza | G02F 1/3134 | 398/200 |
| 2013/0315597 A1 * | 11/2013 | Shaver | H04J 14/0227 | 398/79 |
| 2014/0169793 A1 * | 6/2014 | Harley | H04B 10/505 | 398/79 |
| 2015/0270906 A1 * | 9/2015 | Devgan | H04B 10/5563 | 398/187 |

OTHER PUBLICATIONS

Yao, "Microwave Photonics", Journal of Lightwave Technology, vol. 27, Issue: 3, pp. 314-335, Feb. 1, 2009.

* cited by examiner ations No. FR 1800178, filed on Mar. 1, 2018, the disclosure of which is incorporated by reference in its entirety.

DUAL-BAND PHOTONIC DEVICE AND METHOD FOR CONVERTING FREQUENCY

CROSS-REFERENCE TO RELATED APPLICATIONS

This application claims priority to foreign French patent application No. FR 1800178, filed on Mar. 1, 2018, the disclosure of which is incorporated by reference in its entirety.

FIELD OF THE INVENTION

The invention relates to a dual-band photonic frequency converter, and to a method and to a frequency-converting photonic payload using such a converter.

The invention relates to the field of photonics. It is mainly, but not exclusively, intended to be applied to the field of space telecommunications. It in particular aims to decrease the complexity, weight, bulk, cost and/or power consumption of satellite telecommunication payloads, and in particular of the receivers used at the end of uplinks. However, this concept is also applicable to the conversion to a higher frequency for the transmission of radiofrequency (RF) signals, in particular over downlinks.

In the field of telecommunications, it is often necessary to carry out frequency conversions on radiofrequency signals and on microwave signals in particular. In the field of space telecommunications, frequency conversions are, for example, necessary in order to retransmit over a downlink signals received via an uplink. Frequency conversion may also be used to decrease the frequency of a received signal in order to facilitate processing thereof by electronic circuits, or conversely to increase the frequency of a signal with a view to transmission thereof. Lastly, it may be a question of combining together radiofrequency signals issued from different sources and the spectra of which overlap, in which case a frequency conversion is required to avoid interference. Conventionally, each frequency-conversion operation requires the use of one separate radiofrequency mixer, fed by a local oscillator. When the number of signals to be processed is high, this may lead to the production of frequency-converting systems that are very complex, and therefore expensive, heavy, bulky and of high power consumption—the latter three parameters being particularly disadvantageous in space applications.

BACKGROUND

By way of example, FIG. 1 schematically illustrates the structure and the operation of a microwave frequency-converting device according to the prior art. This device receives as input four radiofrequency signals, for example two ($V_1$, $V_2$) in the V band (40-75 GHz) and two others (Ka1, Ka2) in the Ka band (26.5-40 GHz). After having been amplified and filtered by respective amplifying and filtering circuits, AF1, AF2, AF3, AF4, these signals are delivered to first inputs of four respective microwave mixers MX1, MX2, MX3, MX4. Each of these mixers also receives, via a second input, a single-frequency signal generated by a respective local oscillator $LO_{1vk}$, $LO_{2vk}$, $LO_{3vk}$, $LO_{4vk}$. To its output, each mixer delivers a signal obtained by mixing—i.e. by multiplying together—the signals present at its inputs. In fact, to the output of each mixer the following is delivered: a composite signal containing a first component corresponding to the signal present on the first input but the spectrum of which is shifted "upward" by a frequency equal to the frequency of the local-oscillator signal, and a second component also corresponding to the signal present on the first input but the spectrum of which is shifted "downward" by the local-oscillator frequency. Typically, a filter (not shown) allows a single of these components to be selected. In the example of FIG. 1, the four selected output signals ($Ka_{1d}$, $Ka_{2d}$, $Ka_{3d}$, $Ka_{4d}$) belong to the Ka band. The device therefore makes two conversions from the V band to the Ka band and two conversions within the Ka band.

One drawback of the device of FIG. 1 is that, to make four conversions, it must necessarily use four separate RF mixers. Specifically, if two signals belonging to the same band ($V_1$ and $V_2$, or $Ka_1$ and $Ka_2$) were injected into the same mixer, parasitic signals corresponding to intermodulation products would be delivered as output. In addition, the useful bandwidth of a microwave mixer is quite narrow and does not allow signals belonging to different frequency bands to be mixed. The payloads of telecommunication satellites are generally designed to make several tens of frequency conversions, and therefore require a corresponding number of mixers. This has a very significant impact on the critical parameters of the payload: its mass, its bulk, and its power consumption.

It is known to transpose a plurality of radiofrequency signals to respective optical carriers, then to frequency convert them using electro-optical modulators instead of the radiofrequency mixes of the system of FIG. 1. When a modulator is used for each signal to be converted, this approach—which may be qualified as "photonic"-achieves only a limited reduction in the mass, the bulk and/or the power consumption of the payload. It allows, inter alia, in certain cases a higher spectral purity to be obtained post-conversion and makes it possible to transport the signal via optical fiber, but it requires as many mixers as there are RF signals to be processed.

However, in certain cases a photonic approach allows the number of modulators, i.e. of mixers, to be decreased. For example, it is known to transfer radiofrequency signals to optical carriers of different wavelengths, to multiplex them and to apply them to the input of one and only one modulator: see for example document FR 3 043 514. However, this approach can be used only when it is desired to apply the same frequency shift to a plurality of RF signals. It is of no use when a plurality of radiofrequency signals must undergo different frequency shifts.

Another photonic approach consists in transferring a plurality of single-frequency local-oscillator signals to optical carriers at different wavelengths, in multiplexing them, and in applying them to the input of an electro-optical modulator in order to mix them with a radiofrequency signal: see for example document FR 2 864 385. This approach is suitable only in the case where it is a question of simultaneously applying a plurality of frequency shifts to the same radiofrequency signal. It is also of no use when a plurality of radiofrequency signals must undergo different frequency shifts.

SUMMARY OF THE INVENTION

The invention aims to overcome, partially or completely, the aforementioned drawbacks and limitations of the prior art. More particularly, it aims to provide a device allowing possibly different frequency shifts to be applied to a plurality of different RF signals, and having, with respect to the prior art, a lower mass, power consumption and/or bulk.

According to the invention, this aim is achieved by recourse to a photonic technique, in which a plurality of single-frequency local-oscillator signals are transferred to optical carriers at different wavelengths, multiplexed into the same optical fiber, then mixed with two RF signals by means of the same electro-optical modulator. This allows the number of mixers to be divided at least by a factor of two, this making such a photonic solution even more advantageous. Another advantage of the invention, or of at least certain of its embodiments, is its generic character: specifically, the same frequency converter may be used in a plurality of RF spectral bands. Moreover, the use of a photonic solution according to the invention makes it possible to obtain, under particular modulator biasing conditions, a better spectral purity in terms of frequency lines than in the case of a purely "radiofrequency" solution; more particularly, parasitic intermodulation products may be more effectively rejected.

One subject of the invention is therefore a photonic frequency converter comprising:
  an electro-optical intensity modulator having an optical input and at least one optical output;
  a set of optical sources that are configured to generate optical signals at at least two different wavelengths, said signals being modulated by respective local-oscillator signals at least two of which have different frequencies;
  an optical multiplexer arranged to multiplex said optical signals and to inject them into the optical input of the modulator;
  an optical/electrical detecting system configured to convert the optical signals issued from the electro-optical intensity modulator to the radiofrequency domain; and
  a bank of electrical filters, which is configured to extract spectral components of the signals converted to the radiofrequency domain;
characterized in that the electro-optical intensity modulator also has at least one input for a DC voltage and at least two RF inputs for receiving two modulation radiofrequency signals at different frequencies.

According to various embodiments of such a converter:
  Said electro-optical intensity modulator may be a modulator comprising a Mach-Zehnder interferometer, and more particularly:
    a modulator comprising a dual-drive Mach-Zehnder interferometer and has two RF inputs for two respective modulation radiofrequency signals; or
    a modulator comprising an I/Q Mach-Zehnder interferometer and has two RF inputs for two respective modulation radiofrequency signals; or indeed
    a modulator comprising a single-RF-drive Mach-Zehnder interferometer having a single RF input, the converter also comprising a combiner of RF signals that is configured to receive as input two respective modulation RF signals, to combine them and to apply them to said RF input of the electro-optical intensity modulator.

The converter may also comprise a biasing circuit configured to apply to at least one control input of the electro-optical intensity modulator a bias voltage suitable for minimizing the intensity of a spectral component of the optical signals issued from the electro-optical intensity modulator at a frequency that is the sum or difference of the frequencies of the modulation radiofrequency signals.

The converter may also comprise an optical demultiplexer arranged to demultiplex the optical signals issued from the electro-optical intensity modulator.

Said electro-optical intensity modulator may be a modulator comprising a complementary dual optical output and the optical/electrical converting system may comprise at least one balanced photodetector.

Another subject of the invention is a telecommunication payload for a satellite comprising at least one such frequency converter.

Yet another subject of the invention is a method for converting a frequency by means of at least one such converter, comprising the following steps:
  applying, to the RF input or inputs of the electro-optical intensity modulator of the converter, two radiofrequency signals the frequencies of which must be converted;
  activating the optical sources of the converter and for generating said optical signals at a least two different wavelengths, said signals being modulated by respective local-oscillator signals;
  collecting the optical signals issued from the optical output of the electro-optical intensity modulator, converting them to the radiofrequency domain and filtering them to extract therefrom spectral components each corresponding to one input radiofrequency signal mixed with one of said local-oscillator signals.

The method may also comprise the following step:
  applying to at least one control input of the electro-optical intensity modulator a bias voltage suitable for minimizing the intensity of a spectral component of the RF signals issued from the optical/electrical detecting system at a frequency that is the sum or difference of the frequencies of the modulation radiofrequency signals.

BRIEF DESCRIPTION OF THE DRAWINGS

Other features, details and advantages of the invention will become apparent on reading the description given with reference to the appended drawings, which are given by way of example and which show, respectively.

DETAILED DESCRIPTION

In the present document, the term "radiofrequency" or "RF" will be understood to have a broad meaning, covering all the frequencies in the 3 kHz-300 GHz range. Radiofrequencies comprise microwaves, or mm waves, which correspond to frequencies comprised between 1 GHz and 300 GHz.

The invention will be described with reference to embodiments using certain types of Mach-Zehnder-interferometercomprising electro-optical intensity modulators (below "electro-optical modulators" will be referred to, the clarification "intensity" being omitted), but more generally any type of electro-optical modulator having a number of drives higher than one may be suitable for implementation of the invention. Before describing various embodiments of the invention, it is worthwhile recalling the operating principle of various types of Mach-Zehnder-interferometer-comprising modulators able to be used for this implementation.

Figure 1:
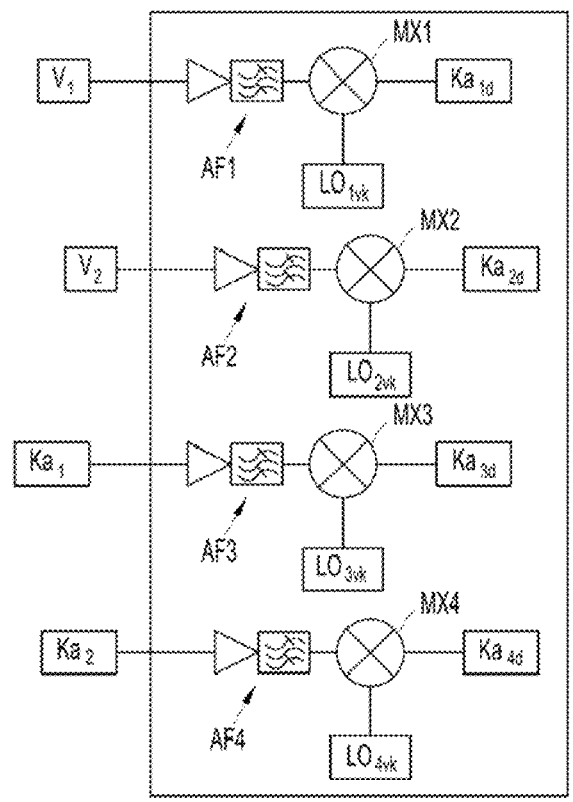
FIG. 1 schematically illustrates the structure and the operation of a microwave frequency-converting device according to the prior art.
Figure 2A:
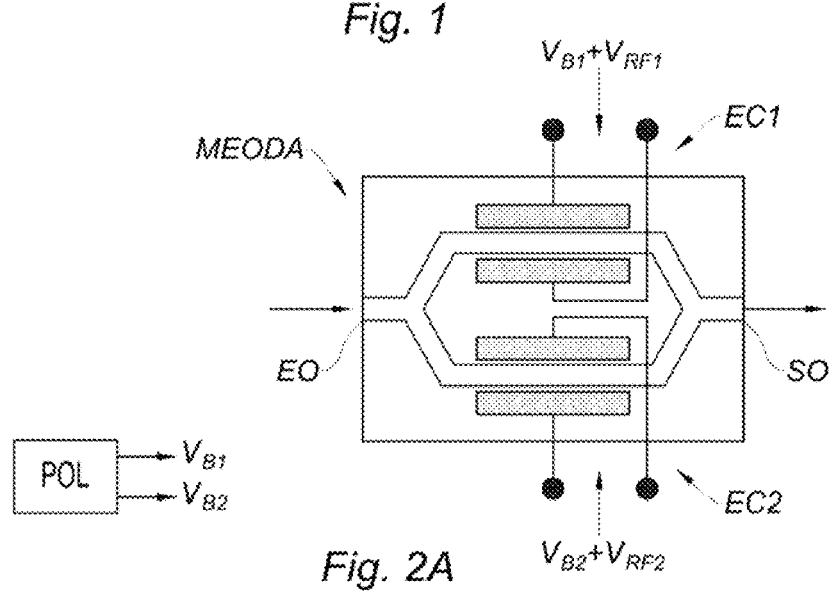
FIGS. 2A to 2D, schematics of various electro-optical intensity modulators able to be used to implement the invention.

FIG. 2A illustrates a dual-drive electro-optical modulator MEODA.

Rectilinearly polarized light is injected into the optical input of the component. It propagates through a plane waveguide made from a crystalline material EO, such as lithium niobate ($LiNbO_3$), having a refractive index that is linearly variable as a function of the applied electric field (Pockels effect). A "Y" coupler splits this waveguide into two arms that run parallel to each other, the light flux being distributed equally therebetween. Two pairs of electrodes are arranged on either side of each of the arms of the interferometer; a first pair of electrodes is connected to a first RF input or port EC1 and a second first pair of electrodes is connected to a second RF input EC2. A DC and/or AC voltage, applied to a control input, modifies the refractive index of the material, and therefore the phase of the light travelling through the corresponding arm, leading to a variation in the optical path. The two arms are then recombined by a second "Y" coupler, this allowing the light travelling therethrough to interfere (the modulator is therefore essentially an interferometer). Thus, the optical intensity received at the output SO of the modulator depends on the phase shift between the two arms of the device, and therefore on the voltages applied to the corresponding electrodes.

Generally, dual-drive modulators have different DC and RF electrodes. The most commonplace structures either have a DC electrode on each of the arms of the interferometer so that two separate DC voltages may be applied separately to each of the arms of the interferometer, or a single DC electrode on two arms of the interferometer. In this case, a single DC voltage is applied to the component. This is the most general case.

In the first embodiment with a modulator similar to that of FIG. 2A, a first DC biasing voltage $V_{B1}$ generated by a biasing circuit POL and a first radiofrequency signal $V_{RF1}$ are applied to the first DC control input and to the first RF input, respectively; and a second DC biasing voltage $V_{B2}$ generated by the biasing circuit POL and a second RF signal $V_{RF2}$ are applied to the second DC control input and to the second RF input, respectively.

The biasing voltages delivered by the biasing circuit POL allow the operating point of the modulator to be set. FIG. 2D shows graphs of intensity modulation transfer function FTMI and of electric-field modulation transfer function FAME as a function of the voltage $V=|V_{B1}-V_{B2}|$. It will be noted that these modulation transfer functions are sinusoidal. The voltage $V_\pi$ corresponds to a phase shift of 7C radians between the two arms of the interferometer. The field transfer function is linear about a biasing voltage $V_\pi$ (and more generally $kV_\pi$, where k is an integer), whereas the intensity transfer function is linear about a biasing voltage $V_{\pi/2}=\frac{1}{2} V_\pi$ (and more generally $(k+\frac{1}{2})V_\pi$, where k is an integer). The choice of the operating point, and therefore of the biasing voltage, is very important; as will be illustrated via FIGS. 7A-C and 8. Specifically, this choice greatly affects the performance of the frequency converter according to the invention. For this reason, the biasing circuit POL allowing the DC voltages to be generated preferably includes a closed-loop control system allowing drift, in particular thermal drift or drift related to the ageing of the component, to be controlled.

In the case of FIG. 2A, two DC biasing voltages are applied to respective control inputs. Generally, in components available on the market, a single biasing voltage ($V_B$ in FIG. 2C) is applied to the modulator via a single control input DC.

Figure 2B:
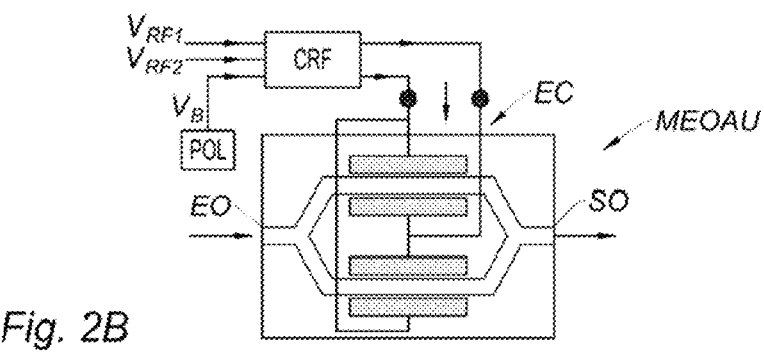
Figure 8:
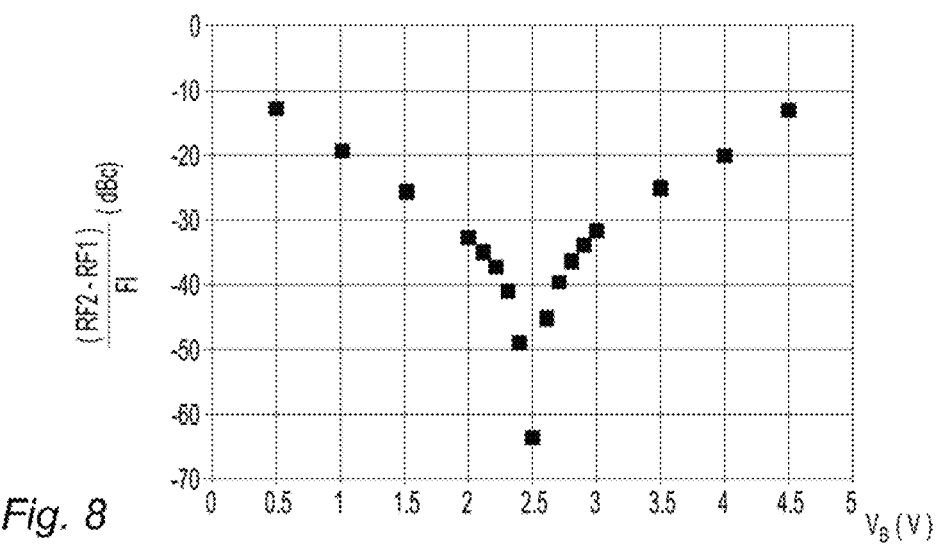
Figure 9:
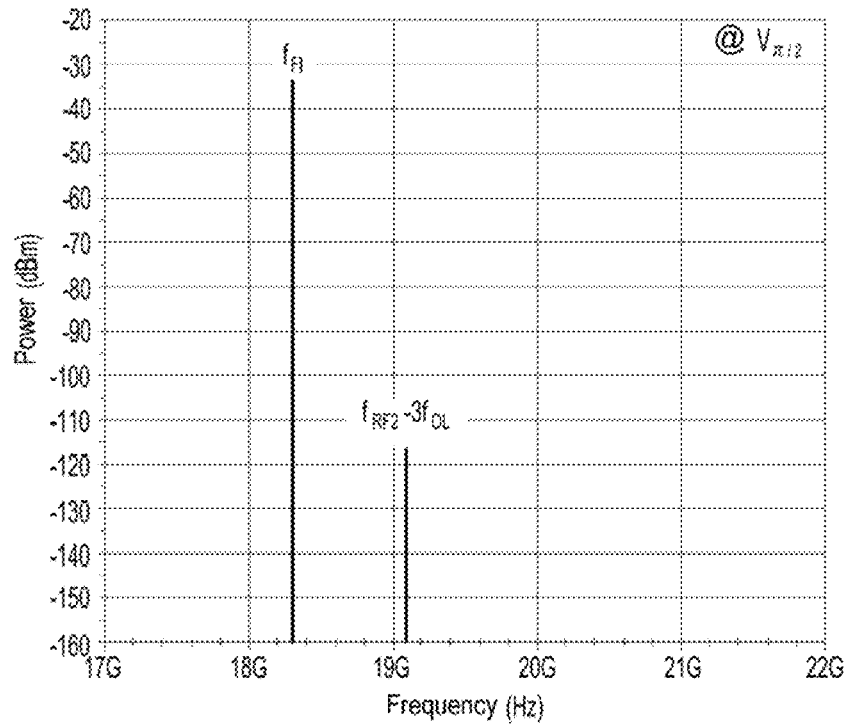

FIG. 2B is a schematic showing the operating principle of a single-RF-drive modulator MEOAU. This modulator differs from the preceding one in that it comprises a single RF input, making it possible to apply the same RF signal—with an inverted polarity—and a biasing voltage $V_B$ to the two pairs of electrodes associated with the two arms of the interferometer. This signal is obtained by combining the two RF signals, $V_{RF1}$ and $V_{RF2}$, the frequencies of which must be converted, by means of an RF combiner referenced CRF. With reference to FIGS. 8 and 9, the use of such a device to implement the invention does not allow an optimal performance to be achieved. Furthermore, the need to use RF combiners limits the passband of the device and forbids any frequency genericness with this type of frequency converter.

As a variant, a single pair of electrodes may be provided for application of the RF signal and the biasing voltage to a single branch. As explained with reference to FIG. 2A, the biasing voltage may also be applied by means of one dedicated input and one dedicated pair of electrodes.

Figure 2C:
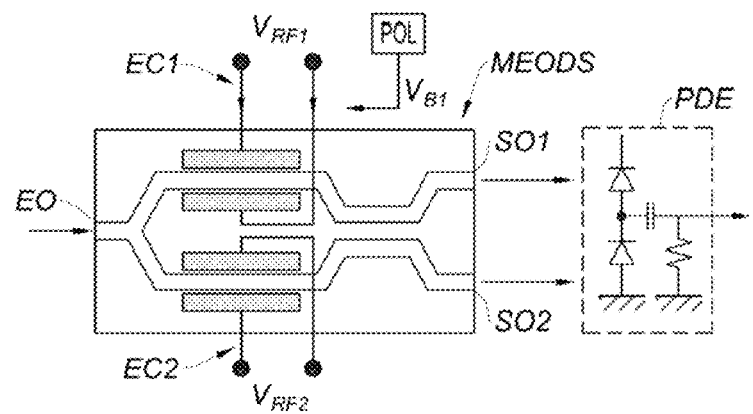
Figure 2D:
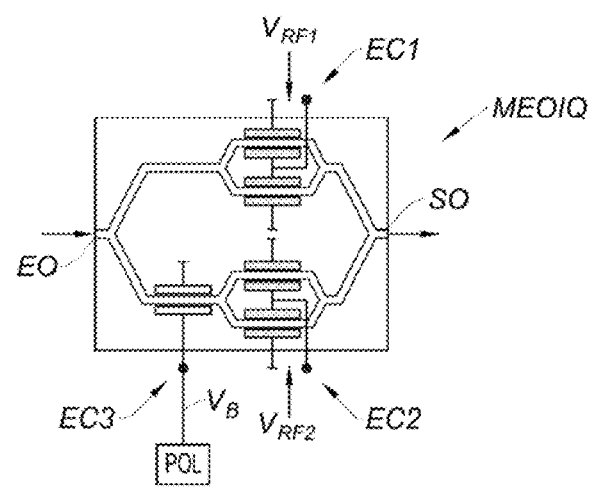
Figure 2E:
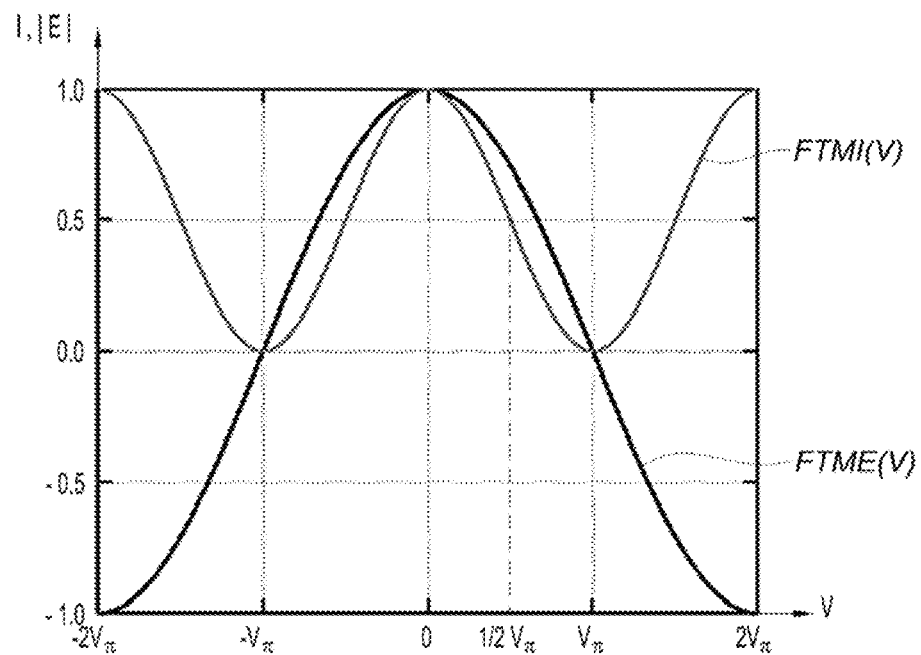
FIG. 2E, a graph illustrating the modulation transfer function of an electro-optical intensity modulator able to be used to implement the invention.

The modulator MEODS (acronym of the French expression modulateur electro-optique à double sortie i.e. dual-output electro-optical modulator) of FIG. 2C is a "dual drive-dual output" modulator. It differs from that shown by FIG. 2A in that the output "Y" coupler has been replaced with a directional "X" coupler. The modulator MEODS thus has two optical outputs SO1, SO2, which are complementary to each other; the phase shift between the two arms of the modulator modifies the distribution of the light intensity between these two outputs. The advantage of such a configuration is that it allows a balanced photodiode, referenced PDE, to be used to convert the differential optical signal output from the modulator into an electrical signal and thus to benefit from the advantages of such a detection (increase in the amplitude of the output RF signal, suppression of amplitude noise, etc.).

As shown in FIG. 2C, a balanced photodiode comprises two optical inputs, consisting of fiber pigtails, respectively feeding two photodiodes that are series mounted with an RF output midway therebetween. For optimal operation of this type of photodiode, it is necessary for the length of the input fibers to be matched, this making its implementation complex with respect to a p-i-n (positive-intrinsic-negative) or standard UTC (uni-travelling carrier) photodiode having a single optical input. A receiver comprising a pair of balanced photodiodes adds at its output the power of the differential signals present on its two optical inputs and suppresses common-mode signals. In other words, it delivers a current corresponding to the difference between the currents respectively generated by the two photodiodes. In the ideal case where the two photodiodes are perfectly identical (same sensitivity and fibers of equal lengths), this cancels out the DC component (and the associated noise). When a standard optical-electrical converter (with a single optical input) is used, the dominant noise sources are relative intensity noise (RIN) and shot noise. Shot noise is proportional to the average detected current, whereas RIN noise is proportional to the square of this current. As the signal-to-noise ratio of an optical link increases with the square of the detected current, the increase in optical power is limited by RIN which then becomes the predominant noise source. A balanced detector allows RIN to be suppressed and thus contributes to improving the signal-to-noise ratio of the link.

FIG. 2D illustrates another type of electro-optical modulator MEOIQ suitable for implementation of the invention. It is a question of a so-called "I/Q" modulator with dual control, this type of modulator generally being used for digital links with complex modulation formats such as quadrature amplitude modulation (QAM), quaternary phase-shift keying (QPSK), m-ary phase-shift keying (m-PSK) or even amplitude and phase-shift keying or asymmetric phase-shift keying (APSK). It comprises two independent Mach-Zehnder modulators that are integrated into a "primary" Mach-Zehnder interferometer. In the example of the figure, the biasing voltage of the primary Mach-Zehnder interferometer is applied to a third DC control input, this allowing the relative phase between the two arms of the interferometer, and therefore the output signal, to be controlled.

Figure 3:
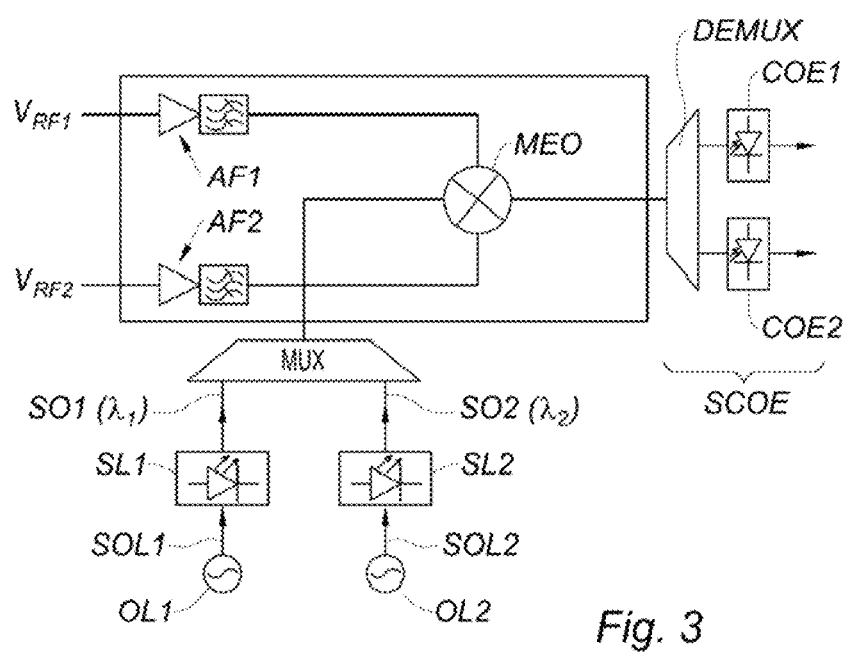
FIGS. 3, 4, 5 and 6, schematics of photonic frequency converters according to four embodiments of the invention.

FIG. 3 illustrates a frequency converter according to a first embodiment of the invention.

The first RF signal $V_{RF1}$, having a central frequency $f_{RF1}$, and the second RF signal $V_{RF2}$, having a central frequency $f_{RF2}$, are amplified and filtered by respective amplifying and filtering blocks AF1, AF2 (optional), then applied to the two RF inputs of a dual-drive electro-optical intensity modulator (see for example FIGS. 2A, 2C, 2D). In FIG. 3 (and also in FIGS. 4, 5 and 6) the modulator—which is optionally equipped with an RF combiner (CRF)—is generally referenced by the reference MEO. The biasing circuit and voltage are not shown for the sake of simplicity.

Two optical sources SL1, SL2, emitting at respective wavelengths $\lambda_1$, $\lambda_2$, are modulated by single-frequency signals SOL1, SOL2 of frequency $f_{OL1}$, $f_{OL2}$, respectively, said signals being generated by local oscillators OL1, OL2, respectively. The references SO1 and SO2 designate optical signals, at wavelengths $\lambda_1$ and $\lambda_2$, respectively, the envelope of which has been modulated at the frequency $f_{OL1}$, $f_{OL2}$, respectively.

The number of optical signals OL, i.e. equal to two, is given merely by way of example and is nonlimiting.

The sources SL1 may for example be semiconductor lasers that are directly modulated by the signals OL1, OL2 if the frequency of the latter is not too high (<15 GHz) or laser sources emitting in continuous-wave regime, their optical flux being modulated by an integrated or external modulator driven by the signals SOL1, SOL2. The optical source and the local oscillator may also be integrated into an optoelectronic oscillator. The signals OL1 and OL2 may be generated in photonic form using, for example, a pulsed laser (or mode-locked laser) or a two-mode laser, the period of the pulses of which in the former case, or the frequency difference between the two modes of which in the latter case, corresponds to the frequency of interest OL.

The optical signals OL thus modulated are multiplexed by a multiplexer MUX (i.e. by wavelength-division multiplexing) and injected into the optical input of the modulator MEO via an optical fiber or, in the case of an integrated solution, a planar waveguide.

To the output of the electro-optical modulator are delivered two optical signals at the wavelengths $\lambda_1$ and $\lambda_2$, the envelope of which has a complex modulation. The signal at the wavelength $\lambda_1$ in particular has spectral components at frequencies $f_{RF1}$, $f_{RF2}$, $f_{OL1}$. Likewise, the signal at the wavelength $\lambda_2$ in particular has spectral components at frequencies $f_{RF1}$, $f_{RF2}$, $f_{OL2}$. These two optical signals are then transmitted by optical fiber (or planar waveguide) to a demultiplexer DEMUX that allows them to be filtered in frequency and to be directed to photodetectors (or optical-electrical converters) COE1, COE2, typically p-i-n (positive-intrinsic-negative) or UTC (uni-travelling carrier) photodiodes.

The electrical signals generated by photodetection of the wavelengths $\lambda_1$, $\lambda_2$ contain spectral components at the frequencies $f_{RF1}+f_{LO1}$, $f_{RF1}-f_{LO1}$, $f_{RF2}+f_{LO1}$, $f_{RF2}-f_{LO1}$, $2f_{LO1}$, $f_{RF1}\pm2f_{LO1}$, and $f_{RF1}+f_{LO2}$, $f_{RF1}-f_{LO2}$, $f_{RF2}+f_{LO2}$, $f_{RF2}-f_{LO2}$, $2f_{LO2}$, $f_{RF1}\pm2f_{LO2}$, respectively. These intermodulation spectral components appear at the moment of detection, because of the fact that the photodetectors are sensitive to light intensity, i.e. to the square of the electric field.

They are then filtered in RF technology in order to extract therefrom the useful components and thus reject the others. For example, the converter of FIG. 3 allows the signal $V_{RF1}$ to be converted to the frequency $f_{RF1}-f_{LO1}$ and the signal $V_{RF2}$ to the frequency $f_{RF2}-f_{LO2}$. A single electro-optical modulator therefore advantageously allows two RF mixers to be replaced.

The assembly consisting of the demultiplexer DEMUX and of the optical-electrical converters COE1, COE2 forms what may be referred to as an optical-electrical converting system, referenced SCOE.

Figure 4:
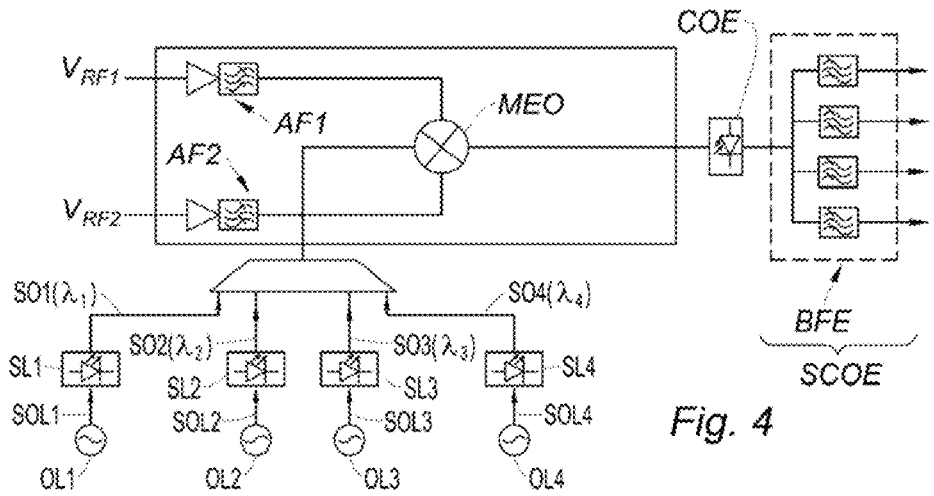

In the embodiment of FIG. 4, more than two optical signals are injected into the modulator MEO. More precisely, in the converter of FIG. 4, four optical sources SL1, SL2, SL3, SL4 emitting at respective wavelengths $\lambda_1$, $\lambda_2$, $\lambda_3$, $\lambda_4$ are modulated by single-frequency RF signals SOL1, SOL2, SOL3, SOL4 of frequency $f_{OL1}$, $f_{OL2}$, $f_{OL3}$, $f_{OL4}$, which signals are generated by local oscillators OL1, OL2, OL3, OL4, respectively. The number four is given merely by way of example and is nonlimiting. This allows multiple frequency conversions to be carried out on the two RF signals $V_{RF1}$ and $V_{RF2}$. For example, the converter of FIG. 3 allows the signal $V_{RF1}$ to be converted to the frequency $f_{RF1}-f_{LO1}$ but also to the frequency $f_{RF1}-f_{LO3}$, and the signal $V_{RF2}$ to the frequency $f_{RF2}-f_{LO2}$ and to the frequency $f_{RF2}-f_{LO4}$.

Furthermore, the embodiment of FIG. 4 differs from that of FIG. 3 in that the converter of FIG. 4 comprises an optical-electrical detecting system SDOE that is different from that of FIG. 3. This system comprises a single photodetector DOE that generates a complex electrical signal the useful spectral components of which are extracted by a bank of electrical filters BFE. In this case, the multiplexed wavelengths must have a sufficiently large frequency spacing for the heterodyne beat at the frequency difference therebetween not to generate parasitic lines in the useful band. This approach facilitates the use of a balanced photodiode for the optical-electrical conversion, provided that the electro-optical modulator is a dual-output modulator (see FIG. 2C).

Of course, the optical-electrical converting system of FIG. 3 may also be used in a converter implementing more than two optical signals, and vice versa the optical-electrical converting system of FIG. 4 may also be used in a converter implementing only two optical signals.

Figure 5:
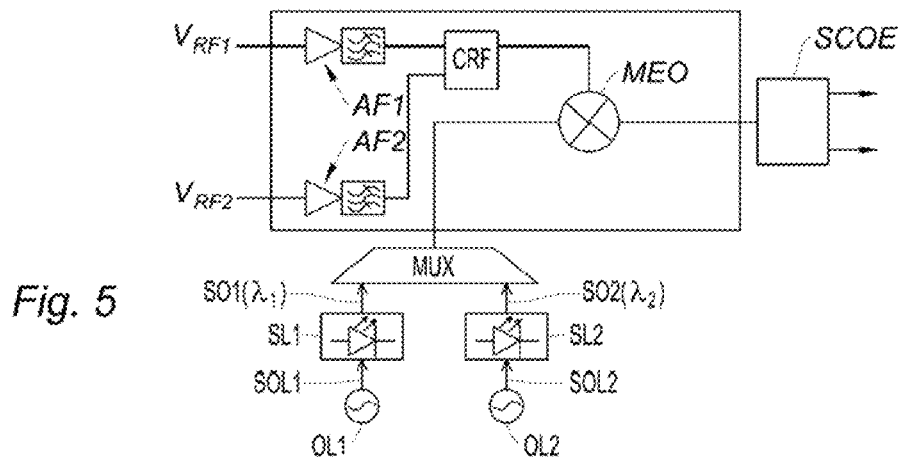

FIG. 5 illustrates a frequency converter according to a third embodiment of the invention, implementing a "single drive-single output" electro-optical modulator, such as that illustrated in FIG. 2B. The two RF signals $V_{RF1}$ and $V_{RF2}$ are combined by the radiofrequency combiner CRF before being applied to the single RF input of the modulator. The structure of the optical-electrical converting system SCOE is identical to the structure shown in FIG. 3 above and consists of a demultiplexer associated with as many photodiodes as there are local oscillators.

Figure 6:
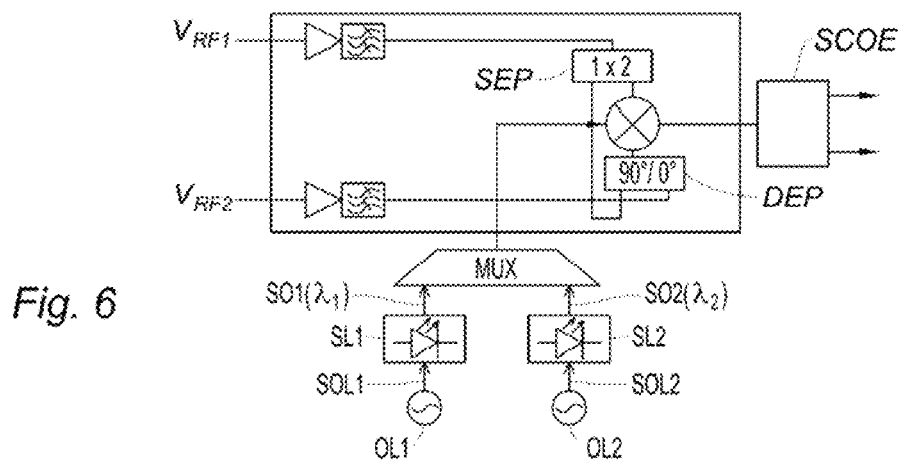

FIG. 6 illustrates a frequency converter according to a fourth embodiment of the invention, in which single-sideband (SSB) modulation is carried out. To do this, the signal $V_{RF1}$ is divided into two components of the same amplitude by an RF splitter referenced SEP. One of these components is applied to the first RF input of the modulator MEO; the other component is phase-shifted, for example by 90° ($\pi/2$ radians) for a quadrature bias, and combined with the second radiofrequency signal $V_{RF2}$ by means of a combiner/phase-shifter DEP before being applied to the second RF input of the modulator MEO (more generally, the value of the phase shift to be applied to obtain an SSB modulation depends on the biasing voltage of the modulator). The presence of purely RF components such as SEP and DEP limits the broadband character of the converter, as is also the case for the embodiment of FIG. 5. The use of a single spectral modulation decreases the number of intermodulation products present in the photodetection signal.

Figure 7A:
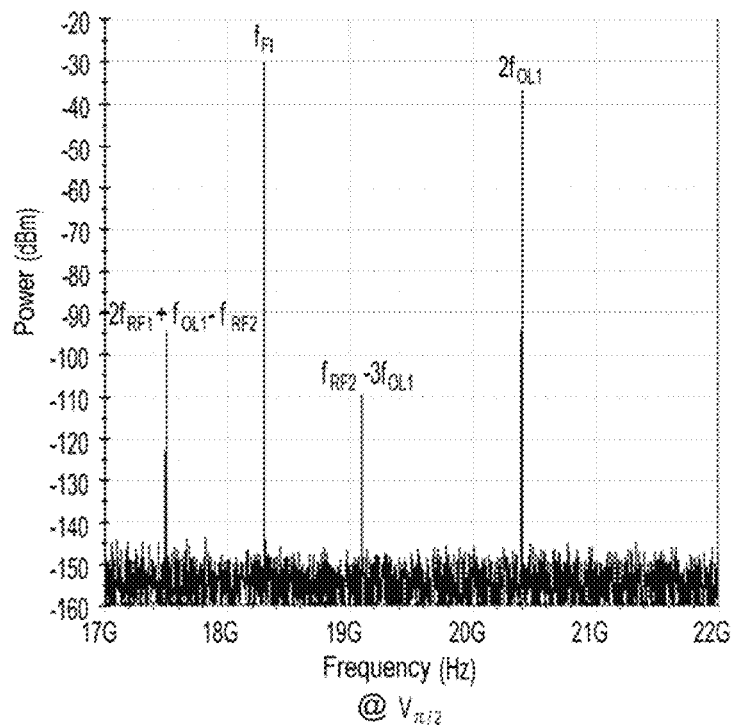
FIGS. 7A, 7B, 7C, 8 and 9, graphs illustrating the performance of photonic frequency converters according to various embodiments of the invention.
Figure 7B:
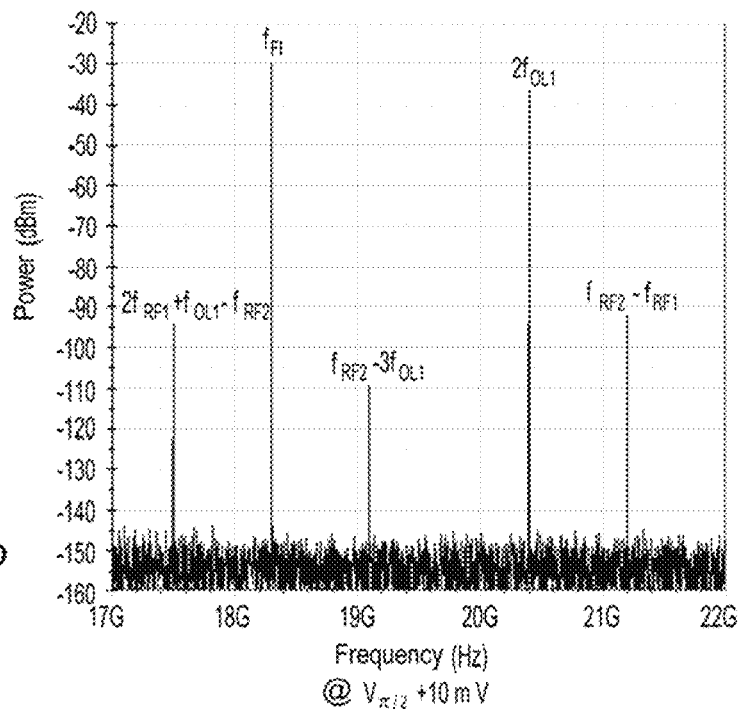
Figure 7C:
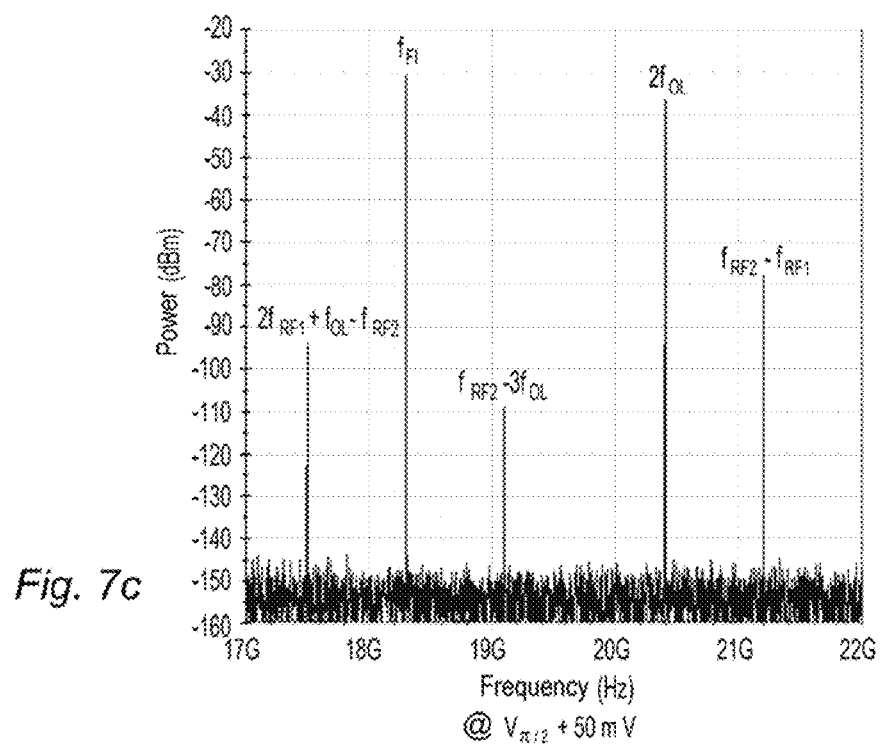

FIGS. 7A to 7C illustrate the performance of a frequency converter according to one embodiment of the invention based on the use of a dual-drive electro-optical modulator (FIG. 2A), and in particular the importance of the choice of the biasing voltage, and therefore of the operating point of the modulator. The case in question corresponds to two RF signals, $V_{FR1}$ and $V_{RF2}$, having frequencies of $f_{RF1}$=28.5 GHz (Ka band) and of $f_{RF2}$=49.7 GHz (V band), and having the same amplitude equal to −10 dBm. For the sake of simplicity, a single optical signal of +14.5 dBm power, modulated at a frequency $f_{OL1}$ of 10.2 GHz has been used. The output signal (envelope of the optical signal output from the modulator) is observed in a spectral range comprised between 17 GHz and 22 GHz (useful band in Ka: 17.2 GHz-20.2 GHz) and therefore including the intermediate frequency $f_{FI}$=$f_{RF1}$−$f_{OL1}$.

FIG. 7A shows the power spectrum of the output RF signal, expressed in dBm, in the case where the biasing voltage $V_B$ has its optimal value $V\pi/2$. This biasing-voltage value is optimal in particular for the first embodiment (described in FIG. 2A) in that it maximizes the rejection of the parasitic line at the frequency $f_{RF2}$−$f_{RF1}$, which is liable to fall in the useful band. However, this optimal biasing voltage may have other values, depending on the type of modulator used. As may be seen, in addition to the useful component at the frequency $f_{FI}$, there is a large parasitic component at a frequency $2f_{OL1}$ and other smaller parasitic components corresponding to intermodulation products at the frequencies $2f_{RF1}$+$f_{OL1}$−$f_{RF2}$ and $f_{RF2}$−$3f_{OL1}$. The component at the frequency $2f_{OL1}$ is not a problem, because it is single-frequency and may therefore be easily removed. The other intermodulation products, in contrast, may give rise to interference, and it is therefore important for their level to remain sufficiently low with respect to that of the useful component.

FIGS. 7B and 7C correspond to situations in which the biasing voltage differs by 10 mV and 50 mV, respectively, from its optimal value. It will be noted that this difference leads to the appearance of a new and dominant intermodulation product, at a frequency $f_{RF2}$−$f_{RF1}$.

In FIG. 8, the square-shaped dots represent the relative power of the intermodulation product at the frequency $f_{RF2}$−$f_{RF1}$ with respect to the power of the useful signal at the frequency $f_{FI}$ (in dBc) as a function of the biasing voltage $V_B$ (the optimal value $V_\pi/2$ being equal to 2.5 V), for the first embodiment. It may be seen that this relative power increases rapidly with the difference $|V_B-V_\pi/2|$, hence the importance of stabilizing $V_B$. For $V_B$=$V_\pi/2$, the intensity of the component $f_{RF2}$−$f_{RF1}$ does not fall to zero, because the plot is limited by the noise floor.

FIG. 9 shows the power spectrum of the output RF signal for the case of $V_B$=$V_\pi/2$, in the case of a dual-output modulator followed by detection with a balanced photodiode (FIG. 2C). It may be seen that the noise is very considerably decreased, to the point of no longer being visible in the figure, and that the parasitic component at the frequency $2f_{RF1}$+$f_{OL1}$−$f_{RF2}$ has disappeared. This better performance is however obtained at the cost of a trickier implementation due in particular to the need to match the length of the fibers between the modulator and the optical receiver.

By way of example, in future very high throughput systems (VHTS) the spectrum of uplink gateways will possibly simultaneously use the Ka and V frequency bands, whereas the downlinks (user beams) will be in the Ka band. Each uplink will require 1 (Ka band) and 2 (V band) different frequency conversions. For example, for a repeater having 50 inputs coming from a gateway, conventional RF technology requires 50 V-band low-noise amplifiers (LNAs), 50 demultiplexers, 100 V-band to K-band converters and 50 Ka to Ka converters.

Figure 11:
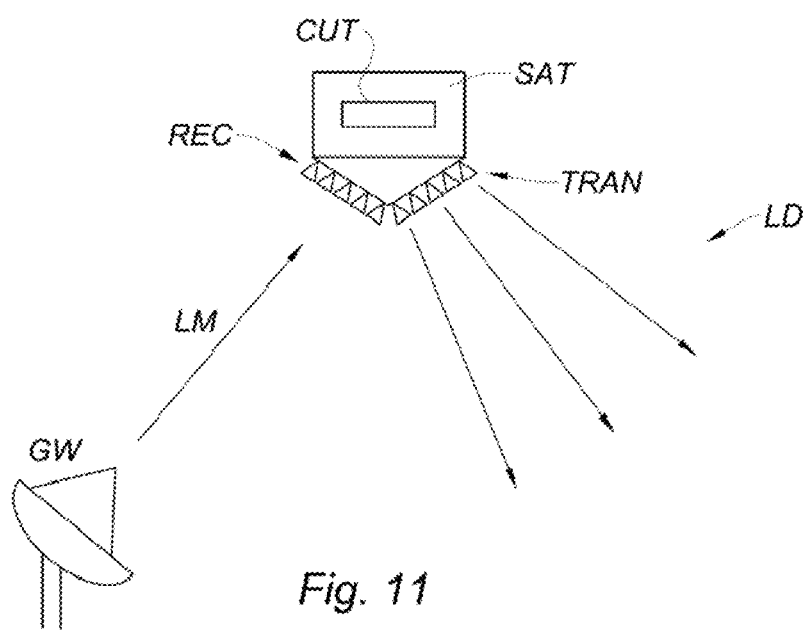
FIGS. 10 and 11, the application of a plurality of photonic frequency converters to a telecommunications satellite payload.

FIG. 11 illustrates a telecommunications satellite SAT comprising: an array of receiving antennas REC for receiving uplink signals LM from a gateway GW; an array of transmitting antennas TRAN for emitting user beams forming a downlink LD; and a telecommunications payload CUT making, inter alia, the required interconnections and frequency conversions.

Figure 10:
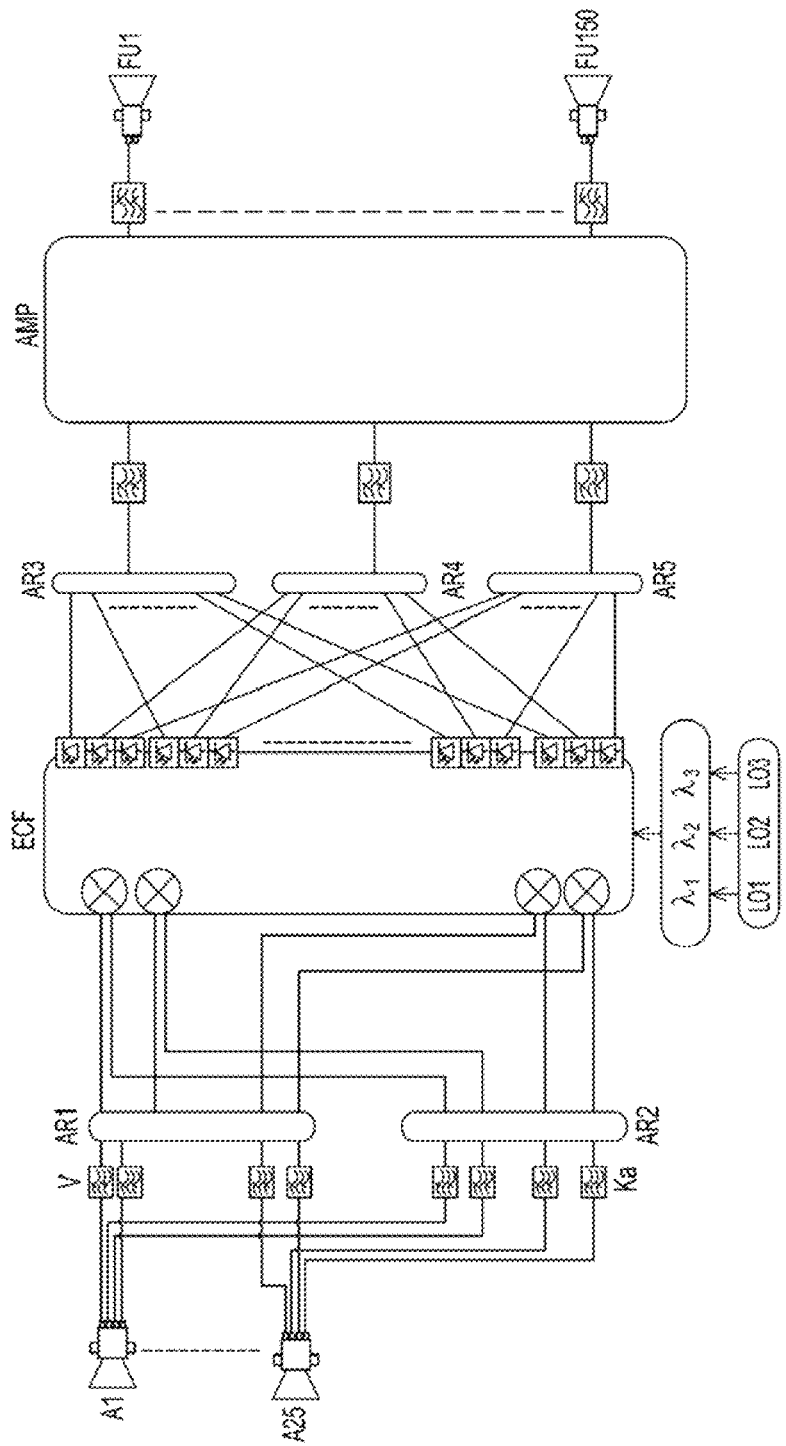

FIG. 10 is a functional schematic of such a payload, which allows this situation to be managed using only 50 photonic frequency converters (vs. 150 for the RF technology) according to the invention. This has a positive and significant impact on the mass, power and cost budgets of the satellite.

The payload of FIG. 10 is a forward path that receives the signals of 25 transmitting stations and that retransmits them in 150 user beams. The number of transmitting stations and of beams is given merely by way of example. The payload comprises an array of 25 antennas A1-A25 that operate, in reception, in the V band (about 50 GHz) and the Ka band (about 30 GHz), with two orthogonal polarizations. Thus each antenna has two outputs, one for polarization and frequency band. Each antenna output is filtered in the appropriate passband, i.e. in V band or in Ka band. Redundancy rings AR1, AR2 based on RF switches there allow additional paths to be implemented in cold redundancy.

The assembly referenced with the reference ECF comprises 50 photonic frequency converters according to the invention. Each electro-optical modulator of this assembly receives a Ka-band signal via a first RF input, a V-band signal via a second RF input, and, via its optical input, three multiplexed optical signals of three distinct wavelengths, $\lambda_1$, $\lambda_2$, $\lambda_3$, said signals being modulated at respective RF frequencies by three local oscillators LO1, LO2, LO3. At the output of each modulator, a photodetector allows RF signals corresponding to the various mixtures of the received RF frequencies generated by the local oscillators to be collected. The three useful signals are:

the signal received in the Ka band, now translated to about 20 GHz;

the two received signals, corresponding to sub-bands of the V band, which are also translated to about 20 GHz.

On output, redundancy rings AR3, AR4, AR5 based on RF switches allow active paths to be selected, and RF filters allow the desired useful sub-band to be filtered, before the signals are routed to the 20-GHz amplifying section AMP.

After power amplification, a last filtering stage allows the spectrum to be cleaned before the signals are re-emitted by the transmitting antennas in 150 user beams.

Figure 12:
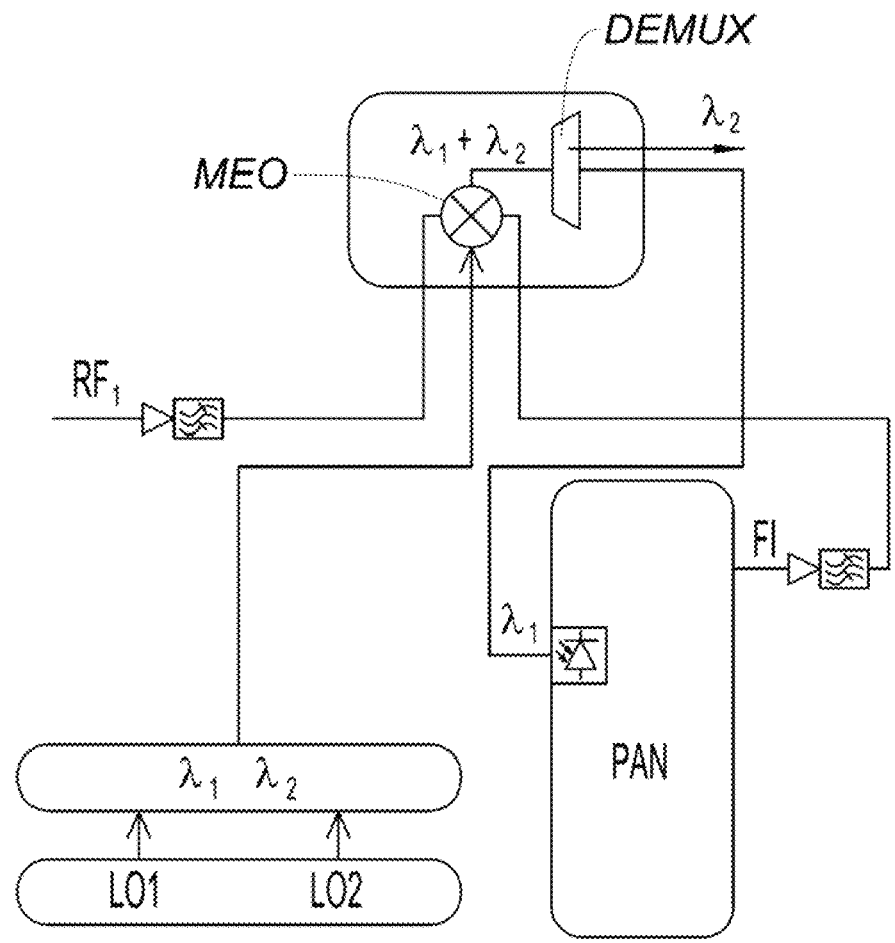
FIG. 12, the schematic of a converter according to one particular embodiment of the invention, simultaneously making an up-conversion and a down-conversion.

FIG. 12 shows a photonic converter that simultaneously down-converts an RF signal, referenced by the reference $RF_1$, and up-converts an intermediate-frequency signal Fi.

In the converter of FIG. 12, a dual-drive electro-optical modulator MEO is simultaneously fed over one of its RF channels with the signal $RF_1$ and other the other RF channel with the signal Fi coming from an analog or digital processor PAN.

Two local oscillators LO1, LO2, of different frequencies, are transferred to optical carriers at wavelengths $\lambda_1$ and $\lambda_2$, respectively, which are wavelength multiplexed and sent to the optical input of the modulator.

The first local oscillator LO1, at the wavelength $\lambda_1$, allows the signal $RF_1$ to be frequency down-converted to a signal at a frequency Fi1 compatible with the input of the processor PAN. After wavelength demultiplexing (DE-MUX), on output from the modulator, only the composite signal at the wavelength $\lambda_1$ conveying the component Fi1 is isolated on one of the corresponding output channels of the multiplexer. This signal is then detected by an optical/electrical converter, filtered (by RF means) and transmitted to the processor for processing.

The second local oscillator LO2, at the wavelength $\lambda_2$, allows the output signal Fi of the processor PAN, at an intermediate frequency, to be frequency up-converted to a radiofrequency $RF_2$ that is transmitted, after filtering, to the output amplifying section of the payload (not shown). After wavelength demultiplexing, on output from the modulator, only the composite signal at the wavelength A2 conveying this component RF2 is isolated in one of the corresponding output channels of the demultiplexer. This signal is then directly detected by an optical/electrical converter or may be transmitted by optical fiber to the RF filters and output amplifying section of the payload. In this case, the optical/electrical conversion is carried out upstream of the RF filters.

In the converter of FIG. 12, the electro-optical modulator MEO is biased in such a way that the amplitudes of the parasitic components at the frequencies RF1±Fi1 are significantly rejected with respect to the amplitude of the desired useful signal.

The invention claimed is:

1. A photonic frequency converter having at least two radiofrequency (RF) input ports, for converting two input RF signals, each of the signals (i) being received on one of the ports and (ii) having a different frequency from the other, into at least two output RF signals at the same time, said photonic frequency converter comprising:
    an electro-optical intensity modulator having an optical input and at least one optical output;
    a set of optical sources that are configured to generate optical signals at a plurality of different wavelengths, said optical signals being modulated by respective local-oscillator signals, at least two of which having different frequencies;
    an optical multiplexer arranged to multiplex said optical signals and to inject them into the optical input of the electro-optical intensity modulator;
    an optical/electrical detecting system configured to convert optical signals issued from the electro-optical intensity modulator to an RF domain; and
    a bank of electrical filters, which is configured to extract spectral components of the optical signals converted to the RF domain to deliver the at least two output RF signals, a frequency of each of the output RF signals being based on a combination of a frequency of one of the input RF signals and a frequency of one of said local-oscillator signals;
    wherein the electro-optical intensity modulator also has at least one input for a DC voltage and at least two RF inputs for receiving at the same time two modulation RF signals having each a different frequency from the other.

2. The frequency converter according to claim 1, wherein said electro-optical intensity modulator is a modulator comprising a Mach-Zehnder interferometer.

3. The frequency converter according to claim 2, wherein said electro-optical intensity modulator is a modulator comprising a dual-drive Mach-Zehnder interferometer and has two RF inputs for two respective modulation RF signals.

4. The frequency converter according to claim 2, wherein said electro-optical intensity modulator is a modulator comprising an I/Q Mach-Zehnder interferometer and has two RF inputs for two respective modulation RF signals.

5. The frequency converter according to claim 2, wherein said electro-optical intensity modulator is a modulator comprising a single-RF-drive Mach-Zehnder interferometer having a single RF input, the converter also comprising a combiner of RF signals that is configured to receive as input two respective modulation RF signals, to combine them and to apply them to said single RF input of the electro-optical intensity modulator.

6. The frequency converter according to claim 2, also comprising a biasing circuit configured to apply to at least one control input of the electro-optical intensity modulator a bias voltage suitable for minimizing an intensity of a spectral component of the optical signals issued from the electro-optical intensity modulator at a frequency that is the sum or difference of the frequencies of the modulation RF signals.

7. The frequency converter according to claim 1, also comprising an optical demultiplexer arranged to demultiplex the optical signals issued from the electro-optical intensity modulator.

8. The frequency converter according to claim 1, wherein said electro-optical intensity modulator is a modulator comprising a complementary dual optical output, the optical/electrical detecting system comprising at least one balanced photodetector.

9. A telecommunication payload for a satellite comprising at least one frequency converter according to claim 1.

10. A method for converting two input RF signals having each a different frequency from the other into at least two output RF signals, by means of a converter according to claim 1, comprising the following steps:
    applying, at the same time to at least two RF inputs of the electro-optical intensity modulator of the converter, two RF signals frequencies having each a different frequency from the other;
    activating the optical sources of the converter and for generating said optical signals at least two different wavelengths, said optical signals being modulated by respective local-oscillator signals;
    collecting the optical signals issued from the optical output of the electro-optical intensity modulator, converting them to the RF domain and filtering them to extract therefrom spectral components to deliver the at least two output RF signals, a frequency of each output radiofrequency signal being based on a combination of a frequency of one of the input RF signals and a frequency of one of said local-oscillator signals.

11. The method according to claim 10 also comprising the following step:

applying to at least one control input of the electro-optical intensity modulator a bias voltage suitable for minimizing an intensity of a spectral component of RF signals issued from the optical/electrical detecting system at a frequency that is the sum or difference of the frequencies of the modulation RF signals.

* * * * *